United States Patent

Schott

[15] 3,698,255
[45] Oct. 17, 1972

[54] MOTION TRANSMITTING MECHANISM

[72] Inventor: Lawrence A. Schott, 15940 Warwick, Detroit, Mich. 48223

[22] Filed: Dec. 29, 1970

[21] Appl. No.: 102,393

[52] U.S. Cl. ............................................... 74/193
[51] Int. Cl. .......................................... F16h 15/16
[58] Field of Search .................... 74/193, 191, 198

[56] References Cited

UNITED STATES PATENTS

| | | | |
|---|---|---|---|
| 3,414,665 | 12/1968 | Parrish | 74/193 |
| 2,119,059 | 5/1938 | Sack | 74/193 X |

FOREIGN PATENTS OR APPLICATIONS

| | | | |
|---|---|---|---|
| 722,605 | 1/1955 | Great Britain | 74/193 |

*Primary Examiner*—Leonard H. Gerin
*Attorney*—Hauke, Gifford & Patalidis

[57] ABSTRACT

A motion transmitting mechanism including a pair of spaced parallel shafts having a conical portion, each tapering in a direction opposite to the conical portion of the other shaft. The rotative movement of the driving shaft conical portion is transmitted to the driven shaft conical portion through a spherical intermediate drive member. The relative velocity of the two shafts is controlled by axial movement of the drive member along the conical portion. A reversing means including a pair of caged spherical members is further mounted normally disengaged from the shafts. Provision is made for engaging the caged spherical members into contact with the respective shafts and at the same time disengaging the first mentioned spherical drive member.

28 Claims, 11 Drawing Figures

PATENTED OCT 17 1972

INVENTOR.
LAWRENCE A. SCHOTT
BY
Hauke Gifford & Patalidis
Attorneys

PATENTED OCT 17 1972 3,698,255

INVENTOR.
LAWRENCE A. SCHOTT
BY
*Hauke Gifford & Patalidis*
Attorneys

MOTION TRANSMITTING MECHANISM

BRIEF DESCRIPTION OF THE INVENTION

This invention relates to a speed changing motion transmitting mechanism and, more particularly, to a mechanism of the friction drive type having opposing cones or frustocones hereinafter referred to as cones. Rotary movement of the driving cone is transmitted to the driven cone through an intermediate spherical member or members. Optionally, one of the cones may be embodied as a right cylindrical shaft.

This type of mechanism as is known in the prior art usually comprises a pair of cones, each mounted on a shaft with the cones being oppositely inclined. In order that the intermediate drive member may operate between parallel surfaces, the cone pairs generally have the same cone angle and the shafts are aligned parallel in their mounting. Variation in the speed of rotation of the driven cone relative to the driving cone is obtained by shifting the intermediate drive member so that it bears against a relatively larger or a relatively smaller part of the driven cone. Thus, to increase the speed of rotation of the driven cone relative to the driving cone, the intermediate drive member is shifted in one direction so as to bear against a larger part of the driving cone and a smaller part of the driven cone. To lower the relative speed of rotation of the driven cone, the intermediate drive member is moved in the opposite direction. A separate shifting means is usually included to provide the required axial movement of the intermediate drive member. Various arrangements may be used to provide this axial movement such as worm threaded screws, shift bars, or other similar type devices. Certain disadvantages have been encountered in prior arrangements of this type. These include difficulties in maintaining the proper degree of contact between the several drive components. It is an object of this invention to provide an improved slip-free frictional type drive. There is further provided an arrangement to change the speed and the direction of rotation. The drive is maintained in the direction desired without back rotation or slippage. The invention further provides a mechanism for ready changeover between forward drive and reverse drive.

BRIEF DESCRIPTION OF THE DRAWINGS

The present invention is exemplified in the accompanying drawings in which like numerals are used to refer to like parts in the several views presented.

DETAILED DESCRIPTION

Figure 1:
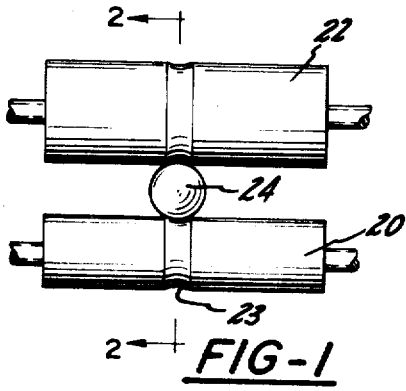
FIG. 1 is an elevational view of a motion transmitting mechanism incorporating a ball drive.
Figure 2:
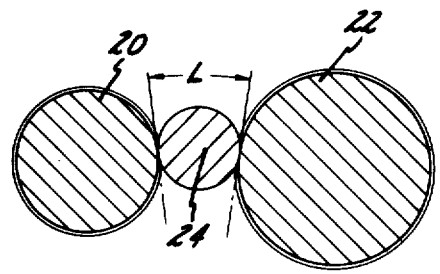
FIG. 2 is a cross sectional view of the FIG. 1 device along the section line 2—2.

With more particular reference to FIG. 1, the drawing shows a pair of aligned shafts of which shaft 20 is the driving shaft and shaft 22 is the driven shaft. The shafts are suitably mounted with their axes parallel between suitable journals, not shown. An intermediate driver member is included for transmitting rotative drive from the shaft 20 to the shaft 22. The intermediate drive member comprises a member of at least partially circular cross section, such as a spherical member or ball 24, retained between opposed tracks 23 each of which is formed on the periphery of the shafts 20 and 22. The spherical member or ball 24 is engaged at either side with the surface of the shafts 20, 22 with a particular angular relationship that is important with regard to the function of the drive mechanism. FIG. 2 shows an angle L which angle represents a "locking angle". The "locking angle" may be described as that angular relationship between a pair of drive shafts and an intermediate spherical drive member through which power is transmitted between the shafts with minimum pressure contact and without slippage. With more particularity, the "locking angle" may be defined as that angle subtended by lines tangent to the two shaft surfaces at their relative points of contact with the periphery of the spherical drive member which causes an automatic self-locking or wedging rolling engagement of the drive member with the shaft surfaces without the help of a preload biasing action urging the drive member in contact with the shaft surfaces. It has been found that the optimum value with regard to providing drive without slippage is a locking angle which has a magnitude greater than 0° but less than 30° with the variance between these limits depending upon the exact geometry of the shafts and the spherical drive members employed, upon the coefficient of friction of the materials used and upon the lubricant used. A "locking angle" of 4°–5° to 15°–20° seems suitable in most applications.

Figure 3:
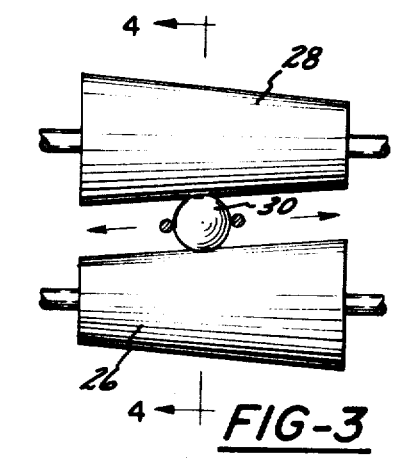
FIG. 3 is an elevational view of an alternate embodiment of a ball drive mechanism in which the driving and driven shafts are of conical configuration.

FIG. 3 shows a motion transmitting mechanism which includes a pair of shafts of conical configuration which are denoted by the numbers 26, 28. The shafts 26, 28 are supported at their ends in suitable journals with their longitudinal axes parallel. The shafts 26, 28 are preferably of the same cone configuration so that the intermediate drive member such as a spherical drive member or ball 30 may conveniently be moved along a parallel path provided between the shafts 26, 28. A suitable means is normally also incorporated for shifting the spherical member 30 either rightwardly or leftwardly in the direction shown by the arrows in order to change the drive ratio and, consequently, the relative velocity between the two shafts 26, 28.

Figure 4:
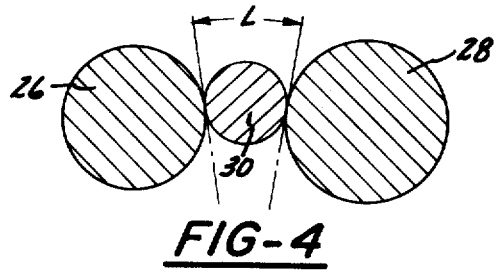
FIG. 4 is a cross sectional view of the device of FIG. 3 along the section line 4—4.

FIG. 4 shows the relationship between the shafts 26, 28 and the ball 30 which again maintains the critical relationship with respect to the "locking angle" L as has been set forth in connection with FIG. 2.

Figure 5:
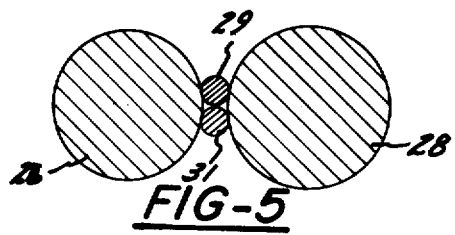
FIG. 5 is a cross sectional view of a substantially similar to that of FIG. 3 except that a second ball drive member is provided at the opposite and lower surfaces of the two shafts.

FIG. 5 is an alternate embodiment of the FIG. 3 mechanism having a first spherical drive member 29 and a second spherical drive member 31 which are maintained in opposing relationship against the upper and lower surfaces of the shafts 26, 28 to provide a speed changing mechanism for drive in one direction with automatic braking action by one ball for the reverse drive of the other. This mode of operation will be further explained with respect to the preferred embodiment of FIG. 8 hereinafter.

Figure 6:
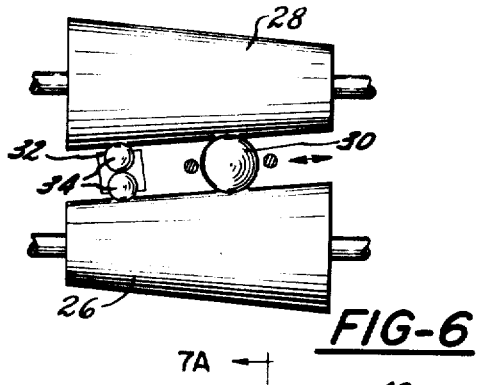
FIG. 6 is an elevational view of an alternate embodiment which further includes a reversing means.

FIG. 6 is substantially similar to FIG. 3 except that it includes in addition to the spherical drive member 30 a separate reversing drive means also mounted between the shafts 26, 28. The reversing drive means includes a cage 32 and a pair of spherical drive members 34 rotatably mounted in cage 32 and in contact with one another. Spherical drive member 30 is engaged with the shafts 26, 28 to provide forward drive of driven shaft 28. Spherical drive member 30 may be disengaged from the shafts 26, 28 and spherical members 34 are engaged with the shafts 26, 28 so that the direction of rotation of the driven shaft 28 is reversed.

Figure 7:
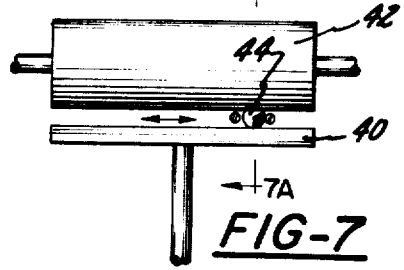
FIG. 7 is an elevational view of a disc-shaft embodiment employing a drive ball.

FIG. 7 is a different embodiment of the invention and illustrates a disc-shaft configuration with drive being communicated between a drive disc 40 and a driven shaft 42 through a spherical drive member 44 which is suitably caged and selectively positioned along the periphery of drive disc 40 to provide the variably output speed desired for shaft 42.

Figure 7A:
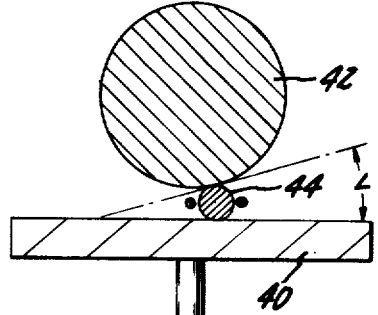
FIG. 7A is a cross sectional view of the device of FIG. 7 along the section line 7a—7a showing further detail of its construction.

FIG. 7A shows the arrangement of the drive disc 40 and the driven shaft 42 and the manner in which the spherical drive member 44 is retained between these members for transmitting drive from the disc 40 to the shaft 42. The spherical drive member 44 is maintained therebetween with the same "locking angle" relationship as has been set forth with respect to FIG. 2. The angle which is critical with respect to this relationship is identified again by the letter L.

Figure 8:
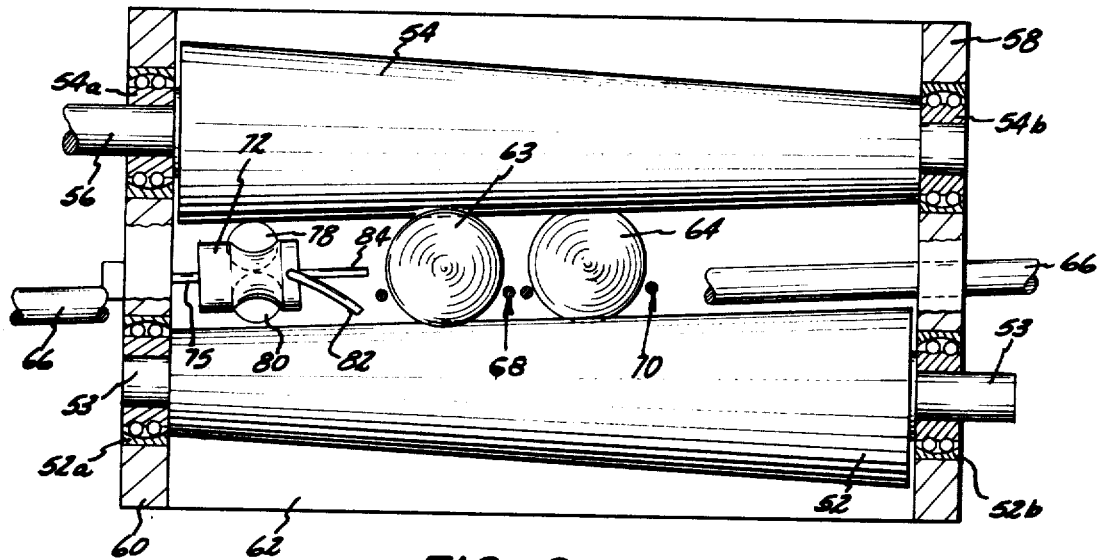
FIG. 8 is a top plan view of a device substantially similar to that shown in FIG. 6 but further including a means for providing drive reversal.

FIG. 8 shows a pair of drive cones 52, 54 which are mounted on an input or driving shaft 53 and an output or driven shaft 56 respectively. The two cones 52, 54 and their associated shafts are suitably mounted for rotation in a pair of upstanding supports 58, 60 which are fixed at opposite sides of a base plate 62. It will be understood that while the preferred embodiment relates to the use of a pair of complementary cones alternately disposed on adjacent shafts, the invention may likewise be used in connection with one shaft of circular configuration and a second shaft of the conical configuration desired. The mechanism for providing rotative drive between the two cones includes a first spherical drive member or ball 63 and a second spherical drive member or ball 64 which are axially spaced and between the peripheries of the cones 52 and 54. The balls 63, 64 and others used in the invention may be fabricated from hardened steel, ceramic, or from carbides of the refractory metals, such as tungsten, titanium, zirconium, vanadium, silicon or hafnium. The ball 63 has its opposite sides in driving engagement with the surfaces of cones 52 and 54. The ball 64 is likewise in engagement with the surfaces of both drive cones 52, 54. The ball 64 is maintained upwardly against the lower surfaces of the cones 54 and 52 by reason of a resilient mounting as will be better shown in greater detail in connection with FIG. 10 hereinafter. The lateral shifting of the balls 63, 64 is achieved by the sliding movement of a shifting means or cross bar 66 which is slidably journaled in supports 58, 60. The ball 63 is held in place by a vertical wire cage 68 which is attached at its upper ends to the cross bar 66. The ball 64 is likewise contained in a cage 70 which extends downwardly from the cross bar 66. The reversing means includes a carrier or cage 72 which is rotatably mounted on a stud 75 journaled in left frame 60. The carrier 72 is further maintained in a disengaged or inactive position with respect to the surface of the cones 52, 54 by reason of a vertical resilient strip or spring 74 which is fixed at its upper end to the enlarged left end portion 76 of the stud 75.

Figure 9:
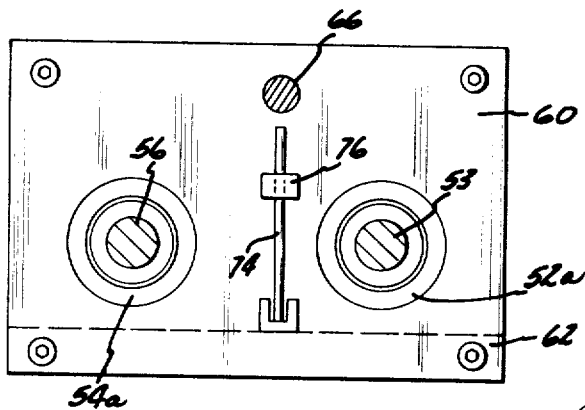
FIG. 9 is a left elevational view of the device of FIG. 8.

FIG. 9 shows the detail of the mounting for the cones 52 and 54, which mounting includes a pair of ball raceways 52a, 52b and 54a, 54b. The aforementioned raceways are included in supports the 58, 60 at either end of the cones 54 and 52 and their associated shafts. The spring 74 is shown in its position maintaining the carrier 72 and its associated balls 78, 80 away from operative contact with the cones 52, 54. It will be seen that the balls 78, 80 are rotatably mounted in the carrier 72 with their inner surfaces in mutual contact and with their outer surfaces respectively engageable in driving contact with the peripheries of the cones 52, 54. The same locking angle relationship discussed and shown in connection with FIGS. 2 and 7A hereinbefore is maintained with respect to the points of tangency of the balls 78, 80 and the cones 54, 52, and with respect to the points of tangency between the surface of the balls 63, 64 and the cones 54, 52. By maintaining this relationship between the several members, it is possible to achieve drive with the elimination of slippage and with a positive driving engagement at all times. During the operation of the mechanism of FIG. 8, there is required a disengagement of the direct or forward drive elements 63, 64 and a simultaneous engagement of the reverse driving means including the balls 78, 80. The movement into an active position of the carrier 72 and its operation to provide reverse direction rotation of the driven cone 54 is achieved by the rotation in a counterclockwise fashion of the carrier 72 against the biasing force provided by vertical spring 74. This is accomplished by the abutment of the vertically oriented cage 68 against a laterally extending cam projection 82 fixed to the upper right hand end of the carrier 72. At the same time, the ball 63 is engaged at its lower surface and urged upwardly by the forward end of a finger 84. It will be seen that the finger 84 is likewise fixed to the right hand side of the lower portion of the carrier 72. Thus, both the engagement of the reversing means associated with the carrier 72 and the disengagement of the forward drive elements comprising the two spherical members 63, 64 is achieved by the selective shifting to its left extreme position of the transverse cross bar 66.

Figure 10:
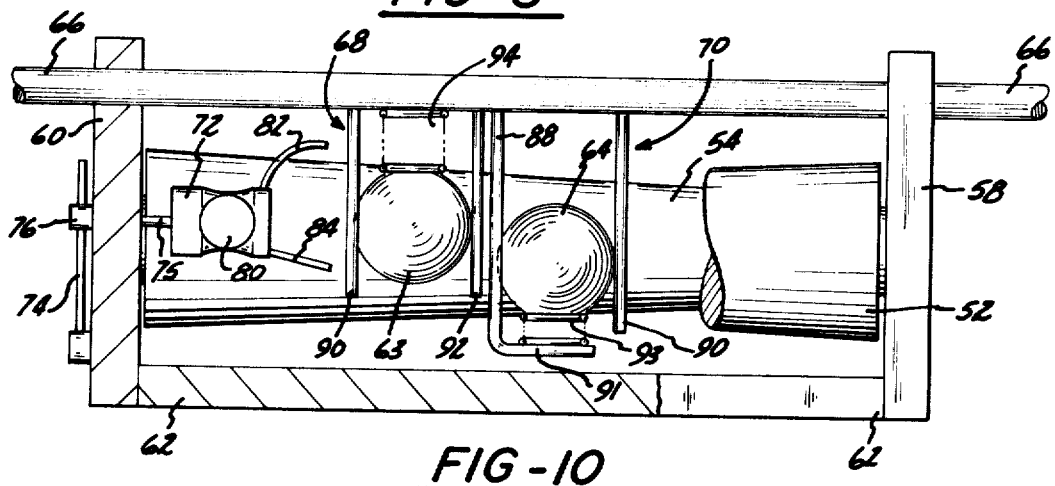
FIG. 10 is a fragmentary front elevational view of the device of FIG. 8 with parts broken away to better illustrate its mode of construction.

FIG. 10 is a front view of the mechanism with the driving cone 52 partly broken away to better reveal the relationship between the several drive elements employed. The detail is shown of the cage 68 which retains the ball 63 in place. The cage 68 includes a left hand, downwardly extending leg 90 and a right hand downwardly extending leg 92 for retaining the ball 62 against lateral dislodgement. A compression coil spring 94, or other convenient biasing means, is mounted between the shiftable cross bar 66 and the upper surface of the ball 63 for urging it downwardly in driving engagement with the surfaces of the cones 52 and 54, respectively. Cage 70 includes a downward extending leg 88 with a circular retaining loop 91 fixed to its bottom end. Included between the upper surface of the loop 91 and the bottom surface of the ball 64 is a compression coil spring 93, or other convenient biasing means, which urges the ball 64 upwardly and into engagement with the surfaces of the cone members 52 and 54, respectively. The right hand leg 90 of the cage 70 retains the ball 64 from lateral displacement. The rotatable mounting for the carrier 72 is further shown with the upper cam projection 82 and the lower finger 84 which are operable respectively for engaging into operation the balls 78, 80 and disengaging from operation the ball 63.

DESCRIPTION OF OPERATION

The description of operation will now be presented giving particular attention to the preferred embodiment as it is disclosed in FIGS. 8, 9 and 10. During the clockwise rotation of the shaft 53, the cone 52 will be rotated clockwise. Drive will then be transmitted through the ball 63 in such a manner that both the cone 54 and the driven or output shaft 56 are rotated in a clockwise direction. The cross bar 66 may be shifted rightwardly or leftwardly thus carrying with it the spherical drive members 63 and 64 to vary accordingly the relative speed of the rotation of shafts 53 and 56. It will further be apparent that during the clockwise rotation of the shaft 53 and its associated cone 52, the upper ball 63 will be the driving ball, while the lower ball 64 will be the idler ball. Otherwise stated, when the rotation of the cone 52 is clockwise, the ball 63 will be rotated counterclockwise. Because of the engagement of the spherical ball 63 with the periphery of the cone 54, the direction of rotation of the cone 54 will likewise be clockwise and in a forward drive direction. If the direction of rotation of the driving shaft 53 and its associated cone 52 are reversed to a counterclockwise direction, there will be a locking action due to the driving engagement of the lower ball 64. In this manner while there is provided a forward rotational drive between the cone 52 and the cone 54, there is provided an immediate limit to any backward rotation in the opposite direction. It will be seen that as the ball 63 is moved leftwardly, the speed of rotation of the cone 54 and the output shaft 56 will be decreased. As the balls 63, 64 are moved rightwardly in accordance with the shift of the cross bar 66, the speed of rotation of the driven shaft 56 will be increased. At the center position of the ball 63 and its associated ball member 64, the drive ratio as between the input and the input and the driving shaft 53 and the driven shaft 56 will be approximately in a 1:1 ratio. Since the relative speed of the driven shaft 56 relative to the driving shaft 53 diminishes as the spherical member 63 is moved leftwardly, the reversing mechanism which includes the carrier 72 and the associated balls 78, 80 is positioned at the leftward extreme adjacent to the support 60. The engagement of the left end leg 90 of the cage 68 with the cam projection 82 of the carrier 72 rotates the carrier 72 counterclockwise to bring the balls 78, 80 into operative engagement with both their associated cone surfaces. At the same time, the lower right hand finger 84 of the carrier 72 will abut against the lower surface of the ball 63 raising it out of operative engagement with the cones 52 and 54, respectively. The clockwise rotation of the cone 52 will then cause a counterclockwise rotation of the ball 80, which in turn causes a corresponding clockwise rotation of the ball 78. This results in a final counterclockwise rotation of the cone 54 and the driven shaft 56.

It will be appreciated that the spherical drive member or ball 63 needs not be biased or urged in engagement with the cones 52 and 54 at all time during the operation of the drive of the invention. As soon as torque is applied to the driving shaft 53, the drive member or ball 63 is automatically maintained in wedging rolling engagement with the cones, and biasing means urging the drive member into engagement with the cones is no longer required. In applications where the mechanism is mounted horizontally with the drive member disposed above the horizontal plane containing the axes of the cones, the only biasing force required to cause the drive member to engage the cone surfaces is provided by gravity.

It will also be appreciated that the action of the ball 64 is only to prevent free wheeling of the driven shaft 56 relatively to the driving shaft 53. The ball 64 therefore needs not be translated along the axis of the cones, and may be disposed in a stationary position, for example, at the right hand end of the cones 52, 54. The ball 64 may also be replaced by a properly journalled roller (not shown) adapted to engage right cylindrical portions of the cones 52 and 54. Also, the reverse spherical members 78 and 80 may be replaced by a pair of peripherally engaging rollers (not shown) suitably journalled in the cage 72, and adapted to be engageable with right cylindrical portions of the cones 52 and 54, respectively.

Accordingly, it will be seen that the present invention provides a novel and improved motion transmitting mechanism which provides a slip-free and efficient drive as between a pair of driving and driven shafts with a minimum of pressure between the parts. It further includes provision for transmittal of such drive and for its reversal, all with a common operating means which may be readily and selectively adjusted according to the output desired.

What is claimed is:

1. A motion transmitting mechanism comprising a driving shaft and a driven shaft spaced therefrom, both of said shafts of circular cross section, a portion of at least one of said shafts of successively increasing diameter; an intermediate drive means comprising a member of at least partial circular cross section; biasing means urging said member in engagement with said pair of shafts; means for shifting said member axially with respect to said shafts for varying the speed of said driven shaft with respect to said driving shaft, said shafts and said member respectively defining a locking angle of a magnitude greater than 0° but smaller than 30°.

2. The combination as set forth in claim 1 wherein said member is formed from a ceramic material.

3. The combination as set forth in claim 1 wherein said member is formed from a carbide of one of the refractory metals.

4. The combination as set forth in claim 1 wherein a reversing means is engageable with said shafts, said reversing means comprising a carrier and a pair of circular cross sectional members rotatably mounted in said carrier in mutual engagement at one side, each of said members having its other side in engagement with a different one of said shafts, whereby the direction of rotation of said driven shaft is reversed.

5. The combination as set forth in claim 4 wherein said carrier includes a means for normally holding it and its members out of contact with said shafts and wherein said shifting means includes a means for engaging said carrier and placing said members of said carrier into contact with their associated shafts.

6. The combination as set forth in claim 5 wherein said carrier includes a cam surface engageable by said shifting means for engaging its aforesaid members into contact with their respective associated shafts.

7. The combination as set forth in claim 5 wherein said means for normally holding said carrier and its members out of contact with said shafts comprises a spring biasing means operatively connected to said carrier.

8. A motion transmitting mechanism comprising a pair of parallel axis like cones oppositely disposed with one driving and the other driven; an intermediate drive means comprising a spherical drive member; a biasing means urging said member in engagement with said pair of cones; means for shifting said drive member axially with respect to said cones for varying the speed of rotation of said driven cone with respect to that of said driving cone, said cones and each of said members respectively defining locking angles of a magnitude greater than 0° but smaller than 30°.

9. The combination as set forth in claim 8 further comprising a second drive member of at least partially circular cross section and having an axis of rotation disposed opposite to said first mentioned drive member relative to the axes of said cones, and means for urging said second member in engagement with said cones.

10. The combination as set forth in claim 8 wherein a reversing means is engageable with said cones responsive to axial movement of said shift means with respect to said cones, said reversing means comprising a carrier and a pair of spherical members rotatably mounted in said carrier in mutual engagement one with the other on one side and each having its other side selectively engageable with a different one of said cones, whereby the direction of rotation of said driven cone may be reversed with respect to the direction of rotation of said driving.

11. The combination as set forth in claim 10 wherein said carrier is rotatably mounted and includes a spring biasing means for normally holding it and its associated members out of contact with said cones.

12. The combination as set forth in claim 11 wherein said carrier includes a cam surface engageable by said shifting means for rotating it and placing its members into contact with their aforesaid associated cones.

13. A motion transmitting mechanism comprising a pair of like cones, said cones spaced and oppositely disposed with one driving and the other driven; an intermediate drive means comprising a pair of balls, each of said balls having its sides in engagement with both of said cones, each of said balls slightly spaced one from the other axially with respect to said cones; spring biasing means operatively connected to each of said balls for maintaining them against said pair of cones in mutually opposing directions; and a shift means for moving both said balls axially with respect to said cones for varying the speed of rotation of said driven cone with respect to that of said driving cone, said cones and each of said balls respectively defining locking angles of a magnitude greater than 0° but smaller than 30°.

14. The combination as set forth in claim 13 wherein said shift means comprises a cross bar mounted and transversely movable in a direction substantially parallel with the centerlines of said cones, wherein said balls are each mounted in a different cage, each of said cages connected to said bar.

15. The combination as set forth in claim 14 wherein a different compression spring is operatively connected between said cross bar and each of said balls for maintaining them in said opposite directions.

16. A motion transmitting mechanism comprising a pair of like cones oppositely disposed with one driving and the other driven; an intermediate drive means comprising a pair of balls; a spring biasing means maintaining each of said balls against said pair of cones in mutually opposing direction; a transverse shifting means for moving said balls axially with respect to said cones for varying the speed of rotation of said driven cone with respect to that of said driving cone, said cones and each of said balls maintained in slip-free driving engagement; and a reversing means selectively engageable with said cones, said reversing means comprising a carrier and a pair of balls rotatably mounted in said carrier having adjacent sides in mutual engagement one with the other and each having its other side selectively engageable with a different one of said cones to reverse the direction of rotation of said driven cone.

17. The combination as set forth in claim 16 wherein said carrier includes a cam surface engageable with said shifting means for camming said carrier and its balls into contact with said cones.

18. The combination as set forth in claim 17 wherein said carrier further includes an outwardly projecting finger engageable with said one of first mentioned balls for moving it away from its driving engagement with said cones coincident with the engaging of said reversing means with said cones.

19. The combination as set forth in claim 17 wherein said cage is rotatably mounted and normally spring biased out of engagement with said cones, said carrier rotatable into engagement for reversing the direction of said driven cone with respect to said driving cone responsive to its abutment with said transverse shifting means.

20. A motion transmitting mechanism comprising a driving shaft and a driven shaft of circular cross section, at least one of said shafts of varying diameter end to end; an intermediate drive means including a circular cross section member, said member having its opposite sides in engagement with both of said shafts; a biasing means maintaining said member against said pair of shafts; means for shifting said member axially with respect to said shafts for varying the speed of said driven shaft with respect to said driving shaft; a reversing means engageable with said shaft, said reversing means comprising a carrier and a pair of circular cross section members rotatably mounted in said carrier, each having adjacent sides in engagement and each having its other side engageable with a different one of said shafts, said shafts and each of said members respectively defining in their engaged positions a locking angle of a magnitude greater than 0° but smaller than 30°.

21. A motion transmitting mechanism comprising a pair of like cones alternately disposed with one driving and the other driven, wherein the improvement comprises an intermediate drive means including a substantially spherical drive member, said member having its opposite sides in engagement with both of said cones; a biasing means maintaining said member against said pair of cones; means for shifting said member axially with respect to that of said driving cone; a reversing means engageable with said cones responsive to axial movement of said shift means; said reversing means comprising a carrier and a pair of spherical members mounted in said carrier in mutual engagement one with the other on adjacent sides and each having its other side selectively engageable with a different one of said cones, whereby the direction of rotation of said driven cone may be reversed with respect to the direction of rotation of said driving cone, said cones and each of said members respectively defining locking angles of a magnitude greater than 0° but smaller than 30°.

22. The combination as set forth in claim 21 wherein said carrier is rotatably mounted proximate said cones and includes a spring biasing means for holding it and its associated members out of operative contact with said cones and wherein said shifting means includes means for engaging a surface of said carrier and driving its members into contact with their associated cones.

23. The combination as set forth in claim 22 wherein said carrier includes a cam surface engageable by said shifting means for rotating it and placing its members in contact with the aforesaid associated cones.

24. A motion transmitting mechanism comprising a driving shaft and a driven shaft spaced therefrom, at least one of said shafts being of a tapered configuration; an intermediate drive means comprising a circular cross section member, said member having its opposite sides biased into contact with both of said shafts and in slip-free driving engagement therewith; biasing means maintaining said member against said pair of shafts; means for shifting said member axially with respect to said shafts between end positions for varying the speed of rotation of said driven shaft with respect to the speed of rotation of said drive shaft; and a reversing means engageable with both of said shafts responsive to one end position of said shift means, said reversing means comprising a carrier and a pair of circular cross section members rotatably mounted in said carrier, said members in mutual engagement on one side and each having its other side engageable with a different one of said shafts, whereby the direction of rotation of said driven shaft is reversed with respect to the direction of rotation of said driving shaft, said shift means conjointly operable to engage said reversing means members with said shafts and to disengage said first mentioned intermediate drive means from contact with said shafts.

25. The combination as set forth in claim 24 wherein said carrier includes a spring biasing means for normally holding it and its members out of contact with said shafts and wherein said carrier further includes a means for disengaging said intermediate member from its contact with said shafts.

26. A motion transmitting mechanism comprising a spaced driving shaft and driven shaft, at least one of said shafts being of tapered configuration; an intermediate drive means comprising a circular cross section member, said member having its opposite sides in engagement with both of said shafts from opposite sides and in slip-free driving engagement therewith; biasing means urging said member in engagement with said pair of shafts; means for shifting said member axially with respect to said shafts for varying the speed of said driven shaft with respect to said driving shaft; a reversing means engageable with both of said shafts responsive to the axial movement of said shift means with respect to said shaft, said reversing means comprising a carrier and a pair of circular cross sectional members rotatably mounted in said carrier, said members in mutual engagement on one side and each having its other side engageable with a different one of said shafts, whereby the direction of rotation of said driven shaft is reversed with respect to the direction of rotation of said driving shaft, said shift means operable to engage said reversing means and disengage said first mentioned intermediate drive means from contact with said shaft; said carrier including a spring biasing means for normally holding it and its members out of contact with said shaft, said carrier further including a finger for raising said intermediate drive means from contact with said shafts.

27. A motion transmitting mechanism comprising a spaced driving shaft and driven shaft, at least one of said shafts having a portion of tapered configuration; an intermediate drive means comprising a member of circular cross section having its opposite sides in engagement with both of said shafts from opposite sides and in self-locking slip-free driving engagement therewith; means for shifting said member axially with respect to said shafts for varying the speed of said driven shaft with respect to said driving shaft; and a reversing means engageable with both of said shafts, said reversing means comprising a carrier and a pair of circular cross sectional members rotatably mounted in said carrier, said members in mutual engagement on one side and each having its other side engageable with a different one of said shafts, whereby the direction of rotation of said driven shaft is reversed with respect to the direction of rotation of said driving shaft.

28. The combination as set forth in claim 27 wherein said carrier includes a spring biasing means for normally holding it and its members out of contact with said shafts and further comprising shifting means for engaging said members in said carrier in engagement with said shafts.

* * * * *

UNITED STATES PATENT OFFICE
CERTIFICATE OF CORRECTION

Patent No. 3,698,255          Dated October 17, 1972

Inventor(s)    LAWRENCE A. SCHOTT

It is certified that error appears in the above-identified patent and that said Letters Patent are hereby corrected as shown below:

IN THE SPECIFICATION

Column 5, line 61, after "the" cancel "input and the input and the"

IN THE CLAIMS

Column 7, line 59, after "driving" insert -- cone --

Signed and sealed this 6th day of February 1973.

(SEAL)
Attest:

EDWARD M. FLETCHER, JR.          ROBERT GOTTSCHALK
Attesting Officer                 Commissioner of Patents